US009505341B2

(12) United States Patent
Schneider et al.

(10) Patent No.: US 9,505,341 B2
(45) Date of Patent: Nov. 29, 2016

(54) MOTOR VEHICLE HEADLAMP

(71) Applicant: GM GLOBAL TECHNOLOGY OPERATIONS LLC, Detroit, MI (US)

(72) Inventors: Ingolf Schneider, Ruesselsheim (DE); Philipp Roeckl, Aschaffenburg (DE); Rouven Haberkorn, Darmstadt (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 166 days.

(21) Appl. No.: 14/460,118

(22) Filed: Aug. 14, 2014

(65) Prior Publication Data
US 2015/0048737 A1 Feb. 19, 2015

(30) Foreign Application Priority Data

Aug. 14, 2013 (DE) .................. 10 2013 013 564

(51) Int. Cl.
*B60Q 1/14* (2006.01)
*B60Q 1/08* (2006.01)

(52) U.S. Cl.
CPC .......... *B60Q 1/1423* (2013.01); *B60Q 1/085* (2013.01); *B60Q 1/1438* (2013.01); *B60Q 2300/314* (2013.01)

(58) Field of Classification Search
CPC ............. H05B 37/02; H05B 37/0218; H05B 37/0227; H05B 37/0245; B60Q 1/04; B60Q 1/085; B60Q 1/1423; B60Q 2300/314
USPC .................................................. 315/77–82
See application file for complete search history.

(56) References Cited

U.S. PATENT DOCUMENTS

| 6,049,171 | A | * | 4/2000 | Stam | .................. | B60Q 1/085 250/208.1 |
| 7,825,600 | B2 | * | 11/2010 | Stam | .................. | B60Q 1/085 315/82 |

FOREIGN PATENT DOCUMENTS

| DE | 19704427 A1 | 8/1998 |
| DE | 10300771 A1 | 5/2004 |
| DE | 102005033841 A1 | 12/2006 |
| DE | 102006003646 A1 | 8/2007 |
| DE | 102007045645 A1 | 5/2008 |
| DE | 102007049619 A1 | 4/2009 |
| DE | 102008025459 A1 | 12/2009 |
| DE | 102010046517 A1 | 4/2011 |
| DE | 102010006190 A1 | 8/2011 |
| DE | 102011003550 A1 | 8/2012 |

* cited by examiner

*Primary Examiner* — Jimmy Vu
(74) *Attorney, Agent, or Firm* — Lorenz & Kopf LLP

(57) ABSTRACT

A method for changing at least one light emission parameter of a headlamp system or a vehicle headlamp of a motor vehicle based on changing ambient light conditions. The light emission parameters of the headlamp system are stored in a memory of a computer at the factory. The ambient light conditions in the driving direction of the motor vehicle are detected by a sensor and forwarded to the computer. Actual light emission parameters of the headlamp system and the ambient light condition are compared and a change of at least one of the light emission parameters of the headlamp system or the vehicle headlamp in accordance with the ambient light conditions forwarded is determined that a predefined or predefinable threshold value or limiting value of the current actual light emission parameters is exceeded.

18 Claims, 2 Drawing Sheets

MOTOR VEHICLE HEADLAMP

CROSS REFERENCE TO RELATED APPLICATION

This application claims priority to German Patent Application No. 102013013564.8 filed Aug. 14, 2013, which is incorporated herein by reference in its entirety.

TECHNICAL FIELD

The technical field pertains to a headlamp system for a motor vehicle in which a headlamp light output can be adapted to changing ambient light conditions, wherein the ambient light conditions are determined by a dedicated sensor of the motor vehicle. In particular, at least one light emission parameter of the headlamp is changed in accordance with parameters of the ambient light conditions when a predefined or predefinable threshold value or limiting value for one or more parameters of the emitted headlamp light is reached or exceeded.

BACKGROUND

DE 199 22 735 A1 discloses an external lighting system for a motor vehicle with a control device for controlling an illumination based on weather conditions and road surface conditions received from an ambient conditions detection device, as well as a corresponding method for controlling an external lighting system for a motor vehicle based on the data acquired by the ambient conditions detection device. For example, an intensity distribution, a light intensity and a color of the light can be changed in order to adapt the external lighting of the motor vehicle to the detected weather and road surface conditions.

SUMMARY

The present disclosure is based on the objective of making available a vehicle headlamp, a headlamp system for a motor vehicle and a motor vehicle with a headlamp or a headlamp system, in which the light emission parameters for a motor vehicle can be adjusted or controlled, as well as a method for changing the light emission parameters of the headlamp. Various embodiment of the present disclosure include an apparatus, a method, and a computer program for adjusting or controlling the headlamp or the headlamp system. These embodiments can be combined with one another in a technologically sensible fashion One aspect of the present disclosure concerns a headlamp system of a motor vehicle for adapting the emitted headlamp light to changing ambient conditions. The headlamp system includes a computer, a headlamp, the light emission parameters of which are stored in the computer in a storage medium or memory, and a sensor for detecting light signals not emitted by the headlamp system of the motor vehicle in front of the motor vehicle referred to the driving direction, as well as for forwarding these light signals to the computer. In this context, the term "in front of the vehicle" includes the light signals of vehicles driving in the same direction and of vehicles driving in the opposite direction.

The computer features software, by means of which the current light emission parameters of the headlamp are compared with the light signals acquired and forwarded by the sensor. When a threshold value or limiting value of the current headlamp light emission parameters predefined or predefinable in the computer is exceeded, the computer initiates a change of at least one of the light emission parameters of the headlamp in accordance with the data on or the parameters of the ambient light conditions acquired and forwarded by the sensor.

In this context, the term emitted headlamp light refers to the light generated by a luminous element such as, for example, one or more LEDs, wherein this light is emitted by the luminous element and may be reflected by a reflector and/or guided through an optical system and a diaphragm before it radiates outward through a headlamp cover plate on the motor vehicle.

The term ambient light conditions refers to the entirety of the light generated in front of the motor vehicle by light sources external of the vehicle. It may consist of sunlight, moonlight, street lighting, shop lighting, commercial lighting or the light of vehicles traveling in the same direction or in the opposite direction, as well as light of the headlamp that is reflected by road signs and road boundary markers.

The sensor is a light-sensitive sensor that covers, for example, an area of a spherical segment in front of the motor vehicle and/or an area that in includes an angle such as 180° in front of the vehicle referred to the driving direction and an angle such as 90° perpendicular to the surface of the roadway, and can detect all light sources in this area.

For example, the threshold value or limiting value may be an essential concurrence between one, several or all parameters of the emitted headlamp light and one, several or all parameters of the ambient light conditions acquired by the sensor. However, the threshold value may also be defined by a similarity or a mere partial concurrence between individual or several parameters, wherein the threshold value may be defined, for example, in the form of an 80-percent concurrence between individual, several or all parameters or in the form of any other partial concurrence.

In this context, the word "a" is basically used as a neutral article in the description and not as a numerical term that limits the quantity to one item. Whenever the term "a" is used as a numerical term, this can be unequivocally recognized based on the context or is bijectively identified by the choice of words such as "a single," etc.

The headlamp system of the motor vehicle usually includes at least two front headlamps. The headlamp system makes it possible to change the light emission parameters of both headlamps jointly and/or individually for each headlamp. If the headlamp system features other headlamps in addition to the two front headlamps, e.g. in order to illuminate curves when turning or fog lamps, these headlamps can also be used for adapting the emitted headlamp light of the headlamp system to the ambient light conditions.

The sensor may detect the ambient light conditions continuously or in a cyclic fashion. The acquired data is converted into signals by the sensor or by a converter unit assigned to the sensor and then transmitted to the computer or a receiving unit of the computer via a wire-bound or wireless link, wherein the signals can be evaluated in an evaluation unit of the computer and subsequently compared with the known data on the light emission parameters of the headlamp. The sensor consists of a light-sensitive sensor such as a camera or another image sensor that is familiar to a person skilled in the art and suitable for this purpose.

The light emission parameters of the headlamp that can be influenced by means of the computer once the computer has determined the required concurrence may consist, for example, of a brightness, a degree of light focusing, a color of the light or a beam angle of the light relative to a longitudinal vehicle axis. The change of one or more light emission parameters of the headlamp makes it possible to alter the cone of light in front of the motor vehicle in such a way that a driver can reliably distinguish the cone of light of his/her motor vehicle from all other light sources in front of the vehicle. In other words, the driver can clearly distinguish the cones of light of motor vehicles traveling in the opposite direction and/or the same direction from the cone of light or the cones of light of his/her motor vehicle and other light effects generated due to reflection, etc. This improves traffic safety.

The headlamp system may feature light sources in the form of one or more LEDs or conventional headlamp bulbs or a combination thereof.

In order to change the light emission parameters of the headlamp, the computer may control, for example, the energy supply to the headlamps in order to dim the lights. Parts of the headlamp such as the optical system and/or the diaphragm can be adjusted by means of a control mechanism. The control signals for the control mechanism can be generated by the computer in dependence on the determined concurrence between the light emission parameters of the headlamp and the ambient light conditions detected by the sensor. The control signals generated by the computer can be transmitted to the control mechanism via a wire-bound or wireless link. In this way, the control mechanism or a drive of the control mechanism is activated and can move the part of the headlamp connected thereto from an actual position into the new position determined by the computer. The drive for the control mechanism may consist, for example, of an electric motor or of an electromagnet that moves part of the headlamp from a first position, into which it may be pre-stressed by a spring force, into a second position when it is activated.

The computer may consist of a local computer of the headlamp system or of a central computer of the motor vehicle. The light emission parameters of the headlamp may already be stored in the computer at the factory. If a total loss of a light emission parameter is detected, the computer may change the light emission parameters of the headlamp or the headlamps without taking into consideration the ambient light conditions such that the emitted light emission parameters in essence compensate the loss of the deficient light emission parameter. For example, if the low beam fails, the high beam can be altered in such a way that it does not blind oncoming motor vehicles, but still provides essentially the normal image for the driver in front of his/her motor vehicle.

Until the defect is repaired, these adapted new light emission parameters replace the standard light emission parameters that were stored, for example, at the factory and are compared with the data delivered by the sensor.

Another aspect of the present disclosure concerns a vehicle headlamp of a motor vehicle that features a sensor for detecting ambient light parameters in front of the motor vehicle. The headlamp features a computer or is connected to a computer that receives the ambient light parameters measured by the sensor and in which light emission parameters of the headlamp are stored. The computer can compare the current light emission parameters of the headlamp with the ambient light conditions measured by the sensor and initiate a change of at least one of the light emission parameters based on the results of the comparison. The computer corresponds to the computer described with reference to the headlamp system. Means for adjusting the light emission parameters were already described in this context. All advantageous embodiments described with reference to the headlamp system can also advantageously enhance the vehicle headlamp.

Another aspect concerns a motor vehicle with at least one above-described headlamp or the above-described headlamp system. Another aspect of the present disclosure concerns a method of control the headlamp system as heretofore described. The described method, as well as its advantageous embodiments, may be carried out in a motor vehicle, particularly in a control unit for controlling a headlamp system or a headlamp of the motor vehicle. The method is a method for controlling a headlamp system in such a way that light emission parameters of a headlamp of the motor vehicle are changed in dependence on changing ambient light conditions.

The method includes storing the light emission parameters of the headlamp specified by the manufacturer in a memory of a computer of the motor vehicle; detecting the ambient light conditions by means of a sensor and forwarding the acquired data to the computer; comparing the current light emission parameters of the active headlamp stored in the memory with the data on the ambient light conditions transmitted to the computer by the sensor with the aid of a computer program; determining a concurrence between the current light emission parameters stored in the memory and the data transmitted by the sensor; generating correction data for the light emission parameters by means of the computer in order to achieve a deviation between the light emission parameters and the ambient light conditions transmitted by the sensor, and transmitting the correction data generated by the computer to actuators that cause a change of the light emission parameters.

The headlamp system particularly consists of the above-described headlamp system of a motor vehicle. The sensor may consist of a camera. The sensor can detect the ambient light conditions, for example, continuously or in a cyclic fashion, convert the ambient light conditions into signals and ultimately forward the signals to the computer. The light emission parameters may consist, among other things, of a brightness of the light, a degree of light focusing, a color of the light or a beam angle of the light relative to a longitudinal vehicle axis. A light source of the headlamp may consist of an LED.

The actuator may consist of a control mechanism, by means of which parts of the headlamp are adjusted, wherein the computer can generate control signals for the control mechanism based on a comparison of the light emission parameters of the headlamp with the ambient light conditions determined by the sensor. However, the actuator may also consist of a device for controlling the energy supplied to the headlamp. The computer may consist of a central computer the motor vehicle. Another aspect of the present disclosure concerns a computer program for carrying out the above-described method. The computer may feature a digital microprocessor unit (CPU) that is data-linked to a storage system and a bus system, a random-access memory (RAM) and a storage means. The CPU is designed for processing commands in the form of a program stored in the storage system, for receiving input signals from the data bus and for delivering output signals to the data bus. The storage system may feature different storage mediums such as, optical, magnetic, solid-state and other non-volatile mediums, on which a corresponding computer program for carrying out the method and its advantageous embodiments is stored. The program may be realized in such a way that it embodies or is capable of carrying out the described methods such that the CPU can execute the steps of such methods and thusly control the headlamp system of the motor vehicle.

A suitable computer program for carrying out a method features program code means for carrying out all steps of the method when the program is executed on a computer. The computer program can be read into already existing control units with simple means and used for controlling a headlamp system of the motor vehicle. The computer program product may also be integrated into control units in the form of a retrofitting option. Another aspect of the present disclosure concerns a computer program product with program code means that are stored on a machine-readable data carrier in order to carry out the above-described method when the program code means are executed on a computer. The computer program product may also be integrated into control units in the form of a retrofitting option.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
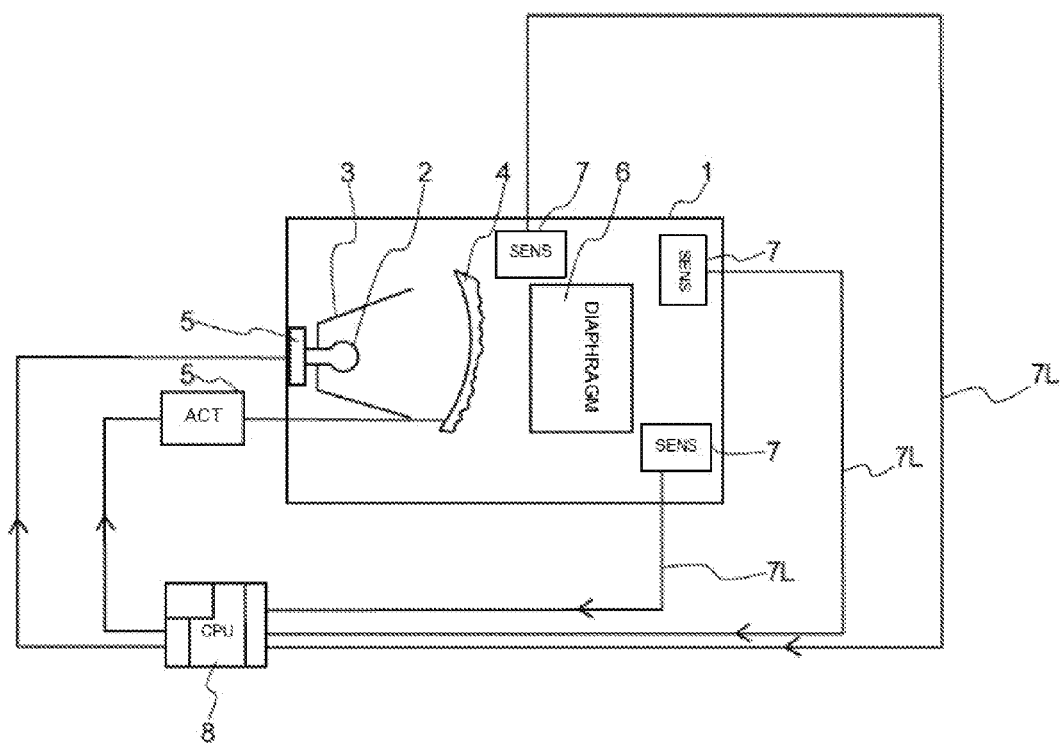
FIG. 1 shows the schematic structure of a headlamp system in the form of a top view.

FIG. 1 shows the basic structure of a headlamp 1 of a headlamp system according to an aspect of the present disclosure. The headlamp 1 shown may consist, for example, of the left front headlamp of a motor vehicle. The headlamp 1 includes a light source 2 and a reflector 3 that respectively has the shape of a funnel or a concentrating reflector and at least partially surrounds the light source 2 laterally. The light source 2 is connected to an actuator 5, wherein the actuator 5 may consist of a dimming device, by means of which a luminous intensity of the light source 2 can be respectively controlled or changed.

An optical system 4 is arranged in front of the reflector 3. The optical system 4 is connected to the actuator 5. In this case, the actuator 5 may consist of a control mechanism, by means of which the optical system 4 can be pivoted about an axis extending parallel to the roadway or turned about an axis extending perpendicular to the roadway.

In the exemplary embodiment shown, the headlamp 1 furthermore features a diaphragm 6 and three sensors 7, wherein two of these sensors are arranged in the headlamp 1 laterally up front and the third sensor is arranged farther toward the rear in an outer side of the headlamp 1.

Sensors may also be arranged on the motor vehicle outside the headlamp such as between two headlamps, in the bumper underneath the headlamp, above the front rail in the roof, on the rear sides of the outside rear view mirrors or in the suspension of the inside rear view mirror.

The headlamp system furthermore features a computer 8 that is connected to the sensors 7, as well as to the light source 2 and the actuators 5. The ambient light conditions detected with the sensors 7 are transmitted to the computer 8 in the form of signals via the lines 7L, wherein the lines 7L may consist of wire lines or wireless links. The transmission of the data on the ambient light conditions acquired by the sensors 7 to the computer 8 may take place continuously or in a cyclic fashion. The cycle time may depend on the frequency of the changes in ambient light conditions. In other words, the cycle time becomes longer as the constancy of the ambient light conditions increases and vice versa. A continuous data transmission may be advantageous, for example, while driving at night in a city or on a busy country road or highway. The cycle time may also be defined by the inertia of an actuator 6 because an actuating drive cannot be changed over with any desired speed.

Headlamp output parameter data that includes the headlamp output data of the headlamp in all operating situations, particularly the variable headlamp output data such as a brightness, a degree of light focusing, a light radiating direction or a color of the light, are stored in a memory in the computer 8 at the factory.

The computer 8 features a receiving unit, by means of which the computer can receive and consolidate data transmitted by the sensors 7. The consolidated data of the sensors 7 then results in the data on the ambient light conditions at the instant of the data transmission to the computer 8. The computer 8 features software that can compare the ambient light conditions with the headlamp output data. If a concurrence is determined or a predefined degree of concurrence is reached or exceeded during the comparison, this indicates that the cone of light of the motor vehicle with the adjustable headlamp system can no longer be clearly distinguished from other light effects. The computer 8 can now calculate correction data in accordance with a predefined algorithm in order to alter the cone of light of the motor vehicle with the adjustable headlamp system such that it can be once again clearly identified by the driver.

An output unit of the computer 8 transmits this correction data to the actuators 5 such that they are activated and change a luminous intensity, a light output angle or a light color. In this way, the headlamp output parameters change and now form the initial data for the next comparison with the data on the ambient light conditions transmitted by the sensors 7.

Figure 2:
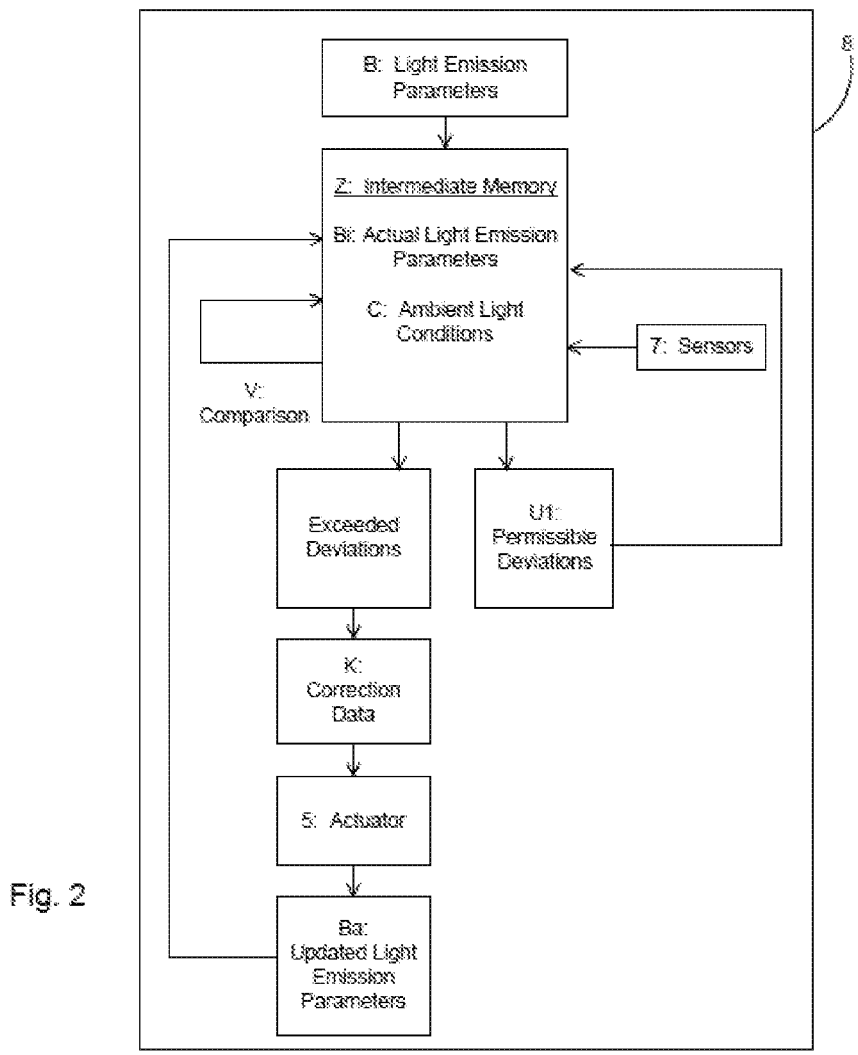
FIG. 2 shows a flow chart of a method.

FIG. 2 shows a flow chart of an exemplary method for a headlamp system in order to change the light emission parameters of the headlamp system or a vehicle headlamp 1 based on changing ambient light conditions. The light emission parameters B of the headlamp in normal operating situations and operating situations of the motor vehicle that can be adjusted by the driver are stored in the computer 8 at the factory. The corresponding light emission parameters B of the headlamp system or the vehicle headlamp 1 are selected from this data when the low beam is switched on and transmitted to an intermediate memory Z.

Data C of sensors 7 that reflects the ambient light conditions, in which the motor vehicle travels, is also transmitted to the intermediate memory Z. A comparison V of the actual light emission parameters $B_i$ stored in the intermediate memory Z with the ambient light conditions C is carried out in the intermediate memory. If the two data sets have permissible deviations U1, i.e. deviations greater than no deviation or than a predefined threshold value or limiting value, the ensuing step of the method is once again a comparison V of the unchanged actual light emission parameters $B_i$ of the headlamp system or the vehicle headlamp 1 with the newly measured and forwarded ambient light data C of the sensors.

If the result of the comparison between the actual light emission parameters $B_i$ and the ambient light conditions C shows that the limiting value between parameters of the emitted light of the headlamp system or the vehicle headlamp and the parameters of the ambient light C is reached or exceeded, the computer 8 calculates correction data K in order to once again return the deviation below the limiting value.

The correction data K is transmitted to an actuator 5 that in response can adjust at least parts of the headlamp system or the headlamp 1 in such a way that the cone of light of the headlamp system or the headlamp 1 of the motor vehicle can be once again distinguished from the ambient light by the driver.

The correction data K simultaneously results in updated light emission parameters $B_a$ that are transmitted to the intermediate memory Z, in which the comparison V between the light emission parameters $B_a$ and the ambient light conditions C is carried out, and now form the new actual light emission parameters $B_i$.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A headlamp system for a motor vehicle comprising:
a headlamp having at least one light emission parameter;
a sensor configured to detect an ambient light condition and convert the ambient light condition into an ambient light signal, wherein the ambient light condition is not emitted by the headlamp in front of a motor vehicle;
a headlamp controller configured to:
store the at least one light emission parameter;
compare a current actual light emission parameter with the ambient light signal acquired from the sensor;
change the at least one light emission parameter in accordance with the ambient light signal when a control value for the current actual light emission parameter is reached; and
store the changed light emission parameter as an updated light emission parameter for a subsequent comparison with the ambient light signals acquired from the sensor.

2. The headlamp system according to claim 1, wherein the control value is selected from the group consisting of a predefined threshold value, a predefinable threshold value and or limiting value.

3. The headlamp system according to claim 1, wherein the sensor continuously detects the ambient light conditions, converts the ambient light conditions into the ambient light signal and forwards the ambient light signal to the headlamp controller.

4. The headlamp system according to claim 1, wherein the sensor cyclically detects the ambient light conditions, converts the ambient light conditions into the ambient light signal and forwards the ambient light signal to the headlamp controller.

5. The headlamp system according to claim 1, wherein the sensor comprises a camera.

6. The headlamp system according to claim 1, wherein the at least one light emission parameter is selected from the group consisting of a brightness, a degree of focusing, a color of the light and a beam angle of the light relative to the longitudinal vehicle axis.

7. The headlamp system according to claim 1, wherein the headlamp comprises a light source having an LED.

8. The headlamp system according to claim 1, further comprising an actuator configured to adjusted at least one part of the headlamp system, wherein the headlamp controller is configured to generate and transmit a control signal for the actuator.

9. The headlamp system according to claim 1, wherein the headlamp controller comprises a central computer of the motor vehicle.

10. The headlamp system according to claim 1, wherein the headlamp comprises a light source, the sensor for detecting ambient light conditions and a headlamp controller configured to control the light source.

11. A motor vehicle comprising the headlamp system according to claim 10.

12. A vehicle headlamp of a motor vehicle comprising:
a light source with at least one light emission parameter,
at least one sensor for detecting an ambient light condition and converting the ambient light condition into an ambient light signal, wherein the ambient light condition is not emitted by the headlamp in front of the motor vehicle; and
a headlamp controller configured to
control the light source,
store the at least one light emission parameter,
compare a current actual light emission parameter with the ambient light signal acquired from the at least one sensor,
change the at least one light emission parameter in accordance with the ambient light signal when a control value for the current actual light emission parameter is reached, and
store the changed light emission parameter as an updated light emission parameter for a subsequent comparison with the ambient light signals acquired from e sensor.

13. A method for changing at least one light emission parameter of a headlamp system of a motor vehicle in response to changing ambient light conditions, the method comprising:
storing a current actual light emission parameters of the headlamp system in an intermediate memory of a computer at the factory;
detecting ambient light conditions in the driving direction of the motor vehicle by a sensor and forwarding to the computer;
comparing the current actual light emission parameters of the headlamp system and the ambient light conditions forwarded by the sensor with one another by the computer,
initiating a change of at least one of the light emission parameters of the headlamp system by the computer in accordance with the ambient light conditions forwarded by the sensor upon determining that a control value of the current actual light emission parameters is exceeded; and
transmitting the updated light emission parameter to the intermediate memory as new updated actual light emission parameter.

14. The method according to claim 13 wherein the control value is selected from the group consisting of a predefined threshold value, a predefinable threshold value or a limiting value.

15. The method according to claim 13, further comprising distinguishing a cone of light of the headlamp system from a cone of light of oncoming motor vehicles.

16. The method according to claim 13, further comprising distinguishing a cone of light of the headlamp system from other light reflections due to a change of the at least one light emission parameter.

17. A computer program for carrying out a method according to claim 13.

18. A computer program product comprising program code stored on a machine-readable data carrier in order to carry out the method according to claim 13 when the program code is executed on a computer.

* * * * *